(12) United States Patent
Core et al.

(10) Patent No.: US 7,938,958 B2
(45) Date of Patent: May 10, 2011

(54) DE-AERATION SYSTEM

(75) Inventors: Phil Core, West Yorkshire (GB); James Ashton, South Yorkshire (GB); Steven Wilson, York (GB)

(73) Assignee: Parker Hannifin (UK) Limited, Dewsbury (GB)

( * ) Notice: Subject to any disclaimer, the term of this patent is extended or adjusted under 35 U.S.C. 154(b) by 0 days.

(21) Appl. No.: 12/371,948

(22) Filed: Feb. 17, 2009

(65) Prior Publication Data

US 2009/0178977 A1 Jul. 16, 2009

Related U.S. Application Data

(63) Continuation of application No. PCT/GB2007/003130, filed on Aug. 16, 2007.

(51) Int. Cl.
*B01D 35/01* (2006.01)
*B01D 35/147* (2006.01)
*B01D 19/00* (2006.01)
*B01D 27/10* (2006.01)

(52) U.S. Cl. ........ 210/128; 210/129; 210/130; 210/133; 210/137; 210/188; 210/436; 210/472; 96/156; 96/162; 96/163; 96/165; 96/219; 123/510

(58) Field of Classification Search .................. 210/128, 210/129, 130, 133, 137, 188, 436, 472, 741; 96/156, 162, 163, 165, 219; 123/510
See application file for complete search history.

(56) References Cited

U.S. PATENT DOCUMENTS

| 6,520,162 | B1 * | 2/2003 | Schueler | 123/510 |
| 2004/0103883 | A1 * | 6/2004 | Geyer | 123/446 |
| 2005/0011497 | A1 * | 1/2005 | Larsson | 123/516 |

FOREIGN PATENT DOCUMENTS

| DE | 40 15 551 C1 | 12/1991 |
| DE | 201 18 185 U1 | 3/2003 |
| DE | 10345225 A1 * | 4/2005 |
| EP | 0 307 739 A2 | 3/1898 |
| EP | 0 307 739 A2 | 3/1989 |
| FR | 2830284 A1 * | 4/2003 |

OTHER PUBLICATIONS

Siebels, Karl H; Machine Translation of EP-0207739-A2 (German version submitted by applicant as prior art).*

(Continued)

*Primary Examiner* — Duane Smith
*Assistant Examiner* — Paul J Durand
(74) *Attorney, Agent, or Firm* — Christopher H. Hunter

(57) ABSTRACT

A de-aeration system for a fuel system, the fuel system having a housing for containing a fuel filter element, a fuel inlet and a fuel outlet is disclosed. The de-aeration system includes a de-aeration valve having a valve inlet in a lower face of the valve for connection to the housing for purging the air trapped in the housing. The de-aeration valve also includes a valve outlet in an upper face of the valve and a ball. The ball is configured to lift between the lower face and the upper face in response to an air pressure differential acting on the ball. This opens the valve to purge air trapped in the housing. The ball is further configured to close the valve by sealing against the valve outlet in the upper face in response to a pressure differential across the ball created by unfiltered fuel entering the valve.

18 Claims, 5 Drawing Sheets

OTHER PUBLICATIONS

Schachtrup, Ludger et al.; Machine Translation of FR-2830284-A1 (French version referenced above).*
DE 10345225 A1—English Machine Translation.*
Notification of Transmittal of the International Search Report and The Written Opinion of the International Searching Authority, or the Declaration dated Mar. 6, 2008 in corresponding International Application No. PCT/GB2007/003130.

Examination Report under Section 18(3) of the UK Intellectual Property Office dated Oct. 7, 2010 in corresponding Great Britain Application No. GB0616515.3.
International Preliminary Report on Patentability dated Oct. 30, 2008 of the European Patent Office in corresponding International Application No. PCT/GB2007/003130.

* cited by examiner

DE-AERATION SYSTEM

CROSS REFERENCE TO RELATED APPLICATIONS

This application is a continuation of copending International Application No. PCT/GB2007/003130, filed Aug. 16, 2007, which designated the United States, the disclosure of which is incorporated herein by reference, and which claims priority to Great Britain Patent Application No. 0616515.3, filed Aug. 18, 2006.

FIELD OF THE INVENTION

The present invention relates to de-aeration devices for fuel filter systems. It has been developed primarily as a device for purging air trapped within a fuel filter system and will be described hereinafter with reference to this application. However, it will be appreciated that the invention is not limited to this particular field of use.

BACKGROUND

Known fuel filter systems include a housing and a filter element contained therein. Unfiltered fuel is pumped or sucked into the housing via a fuel inlet and exits through a fuel outlet once it has passed through the filter element. The filter element typically includes a 'dirty fuel side' where the unfiltered fuel enters the housing and 'clean fuel side' where the filtered fuel exits the housing. All the impurities which are separated from the fuel remain trapped in the dirty fuel side of the housing until the housing is emptied.

A disadvantage of this system is that the efficiency of the filter is reduced by any air trapped in the fuel filter after servicing or accumulated during the running of the fuel system. Air may accumulate in the 'dirty fuel side' of the system during running, when the filter element becomes wet because it acts as a barrier and any air which is contained in the unfiltered fuel is prevented from passing through the wetted filter element pores. Hence the air is left behind with the impurities trapped in the housing. This accumulated air takes up space which could potentially be used to contain filtered impurities or unfiltered fuel instead. The amount of space taken up by the accumulated air may reach up to 80% of the filter volume on the 'dirty fuel side'. Hence, this reduces the volumetric efficiency of the filter system and may also increase the frequency in which the filter element must be serviced.

One method of releasing trapped air from a housing is to purge the air back into the filtered fuel outlet line. However, in doing this, there is a risk that as the level of the unfiltered fuel contained within the housing rises, the unfiltered fuel may also pass into the filtered fuel outlet line, which would result in the unfiltered fuel bypassing the filter element and contaminating the fuel system. If the unfiltered fuel then passes into the fuel injector gallery, this may affect the performance of the engine.

The present invention has been made, at least in part, in consideration of the problems and drawbacks of conventional systems.

SUMMARY OF THE INVENTION

An aspect of the invention provides a de-aeration system for a fuel filter system, the filter system having a housing for containing a fuel filter element, a fuel inlet and a fuel outlet, the de-aeration system including:

a de-aeration valve having:
  a valve inlet in a lower face of the valve for connection to the housing;
  a valve outlet in an upper face of the valve; and
  a ball having a relatively higher density than fuel in the filter system, wherein the ball is configured to lift between the lower face and the upper face in response to an air pressure differential acting on the ball for opening the valve to purge air trapped in the housing, and wherein the ball is further configured to close the valve by sealing against the valve outlet in the upper face in response to a pressure differential across the ball created by unfiltered fuel entering the valve.

The outlet may be in fluid communication with a filtered fuel outlet line which may receive filtered fuel from a clean fuel side of the fuel filter element.

In an alternative embodiment, the outlet may be in fluid communication with a fuel tank and the outlet may include a bypass groove configured to provide a slight bleed for aerated fuel to exit the outlet and return to the tank.

The housing may comprise a filter head including the fuel inlet, the fuel outlet and the de-aeration valve, and a filter receptacle selectively engageable with the filter head for containing the fuel filter element.

The de-aeration valve may be adapted to provide purging of air trapped between the filter element and the internal walls of the housing.

The ball may be configured to seal against the valve inlet in the lower face when the fuel flow cycle through the filter system is not running.

The system may be adapted such that when the fuel flow cycle through the filter system ceases, gravity may return the ball to the lower face and a portion of the filtered fuel contained in the outlet may move into the valve, potentially sealing the ball against the lower face.

The ball may be configured to move between the lower face and the upper face in response to air re-accumulating in the valve to allow the trapped air to exit the valve.

The inlet and outlet may be approximately 1-15 mm in diameter, and the outlet may be approximately 1-15 mm in diameter. In one embodiment, the inlet and/or outlet may be approximately 5 mm in diameter.

The ball size may be between approximately 2-20 mm in diameter. The ball diameter may be larger than the inlet and outlet diameter.

According to a further aspect of the invention, there is provided a fuel filter system including a de-aeration system a described above.

The fuel filter system may comprise a primary fuel filter including a primary de-aeration ball valve having an outlet in fluid communication with a filtered fuel outlet line which may receive filtered fuel from a clean fuel side of a fuel filter element.

In an alternative embodiment, the fuel filter system may comprise a final fuel filter including a final de-aeration valve having a valve outlet in fluid communication with a fuel tank. The outlet may also include a bypass groove configured to provide a slight bleed for aerated fuel to exit the outlet and return to the tank.

The final fuel filter may include a filtered fuel outlet in fluid communication with an injector gallery. The final fuel filter may include a fuel outlet valve in the form of a ball valve. The ball valve may be resiliently biased in a closed configuration by a spring or the weight of the ball.

According to a further aspect of the invention, there may be provided a fuel filter system having a primary fuel filter as described above and a final fuel filter as described above. The primary fuel filter may be positioned between the fuel tank and the suction side of a main pump. A primer pump may also be installed either before or after the primary filter. The final filter may be positioned on the pressure side of the main pump.

Another aspect of the invention may provide a method of purging air trapped in the housing of a fuel filter system using a de-aeration valve having:

a valve inlet in a lower face of the valve for connection to said housing;

a valve outlet in an upper face of the valve; and a ball having a relatively higher density than fuel in the filter system;

the method comprising the steps of: connecting the valve inlet to the housing;

directing fuel into the housing to create an air pressure differential acting on the ball, whereby the ball lifts between the lower face and the upper face for opening the valve such that the air may exit the housing via the inlet; and directing fuel into the housing until unfiltered fuel enters the valve, whereby the ball closes the valve by sealing against the valve outlet in the upper face in response to a pressure differential across the ball created by the unfiltered fuel entering the valve.

Hence the present invention may be advantageous over the prior art as it provides a de-aeration system which may allow air to escape from the fuel filter housing whilst reducing the likelihood of any collected impurities or unfiltered fuel from mixing with the filtered fuel. Allowing air to escape from the fuel filter may be advantageous as it may improve the volumetric efficiency of the filter.

BRIEF DESCRIPTION OF THE DRAWINGS

Preferred embodiments of the invention will now be described, by way of example only, with reference to the accompanying drawings in which.

DESCRIPTION

Figure 1:
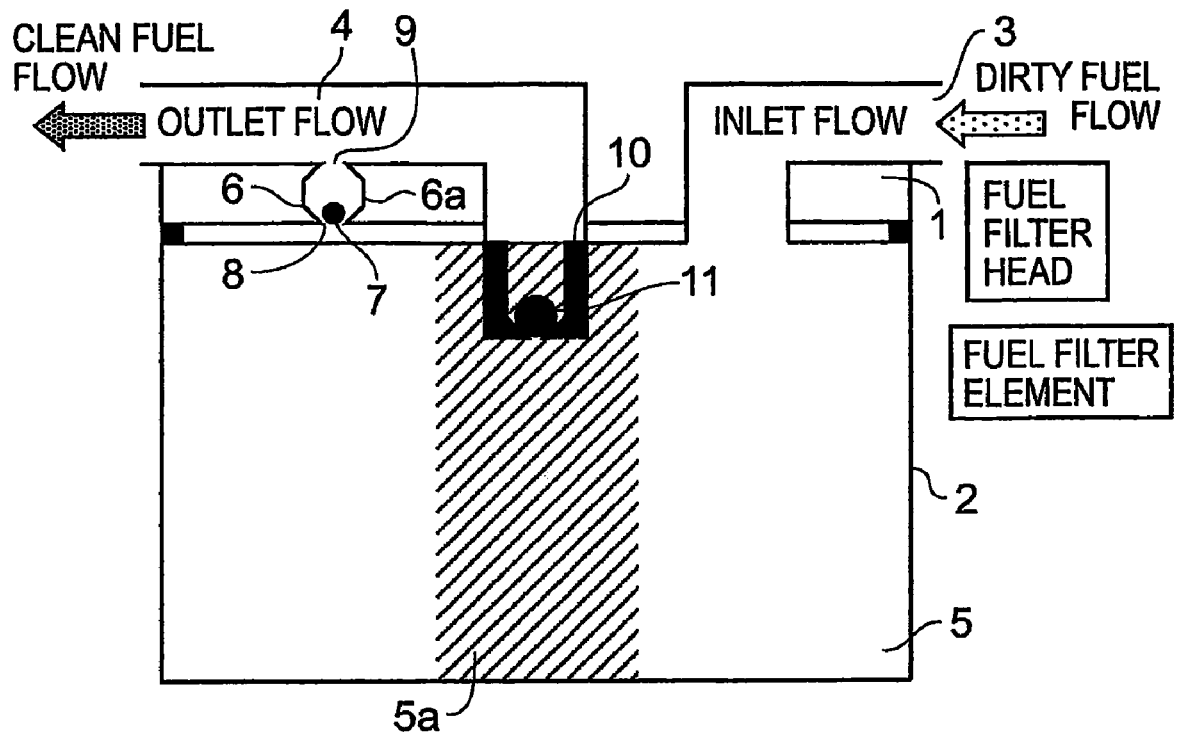
FIG. 1 is a cross-sectional side view of a de-aeration system according to the invention, shown when the fuel filter is in its un-primed condition.

Referring to the drawings, the fuel filter includes a filter housing having a filter head 1 and a selectively removable filter receptacle 2. The filter head 1 includes an unfiltered fuel inlet line 3 and a filtered fuel outlet line 4. The receptacle 2 is mounted to the filter head 1 and contains a fuel filter element 5 for separating impurities from the inflowing fuel. The fuel filter element has a 'dirty fuel side' where the unfiltered fuel enters the filter and a 'clean fuel side' where the filtered fuel exits the filter. The fuel filter element 5 of this example has a hollow core 5a which is on the 'clean fuel side' of the fuel filter element 5. Fuel is moved through the inlet and outlet lines via a fuel pump. The fuel filter may be installed on the suction side or the pressure side of a fuel pump.

The filter head 1 includes a de-aeration valve 6 in the form of a double-sealing ball valve having, a valve housing 6a, with an inlet forming part of a lower sealing face 8, an outlet forming part of an upper sealing face 9. The de-aeration valve 6 also includes a de-aeration ball 7 contained in the valve housing 6a, which is moveable between the inlet and outlet. The diameter of ball 7 is greater than the diameter of the inlet or outlet, hence the ball is contained within said valve housing 6a. In alternative embodiments, the valve 6 may be remote from the filter head 1.

The valve inlet is in fluid communication with the dirty fuel side of the filter and the valve outlet is in fluid communication with the outlet line 4. During running of the filter system, this arrangement provides a path for air trapped in the dirty fuel side of the filter to bypass the fuel filter element 5 and be expelled directly into the filtered fuel outlet line 4. In an alternative embodiment shown, for example in FIG. 6, the air may be returned to the fuel tank from which the unfiltered fuel was fed via a line running between the de-aeration valve 6 and the tank.

Referring to FIG. 1, this shows the fuel filter in an un-primed condition. When no fuel is being pumped/sucked through the inlet line 3, gravity causes the ball 7 in the de-aeration valve 6 to sit on the lower sealing face 8, creating a seal.

Figure 2:
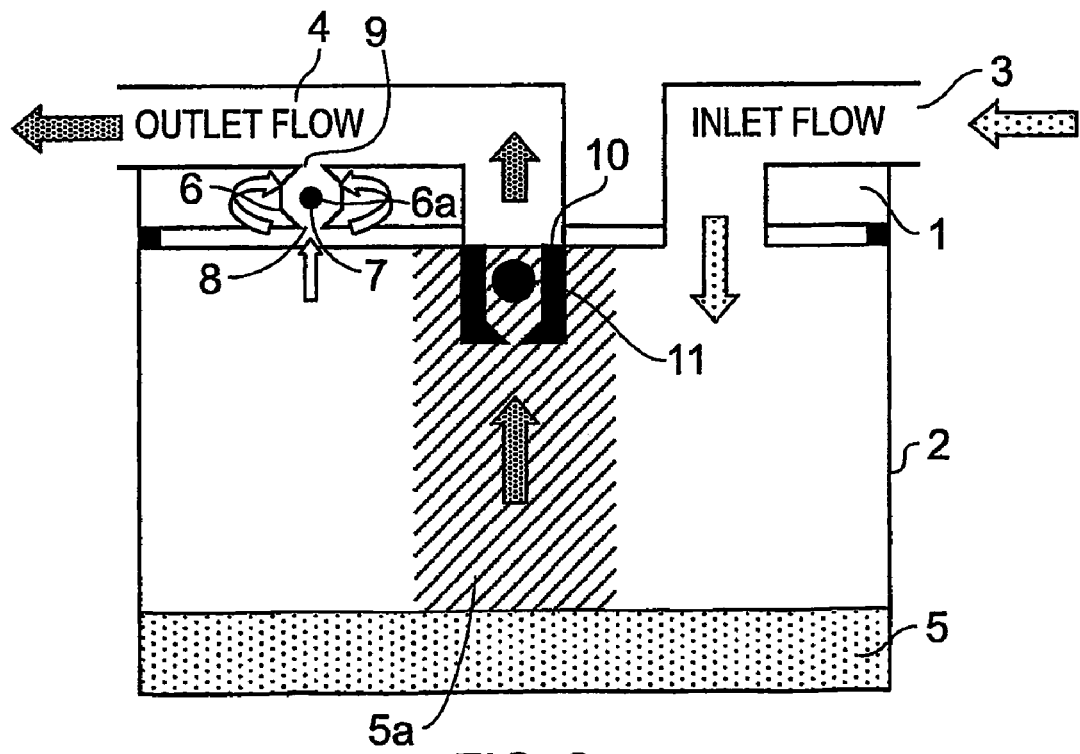
FIG. 2 is a cross-sectional side view of the de-aeration system, showing fuel being pumped into the fuel filter.

As fuel enters the receptacle 2 from the inlet line 3, a differential pressure drop occurs across the outlet. The valve housing 6a and ball 7 are designed such that when air is being primed or sucked through the fuel filter, the resulting pressure drop across the inlet to outlet side of the valve 6 is sufficient to lift the ball 7 from the lower sealing face 8. The pressure drop causes the ball 7 to lift midway between the lower sealing face 8 and the upper sealing face 9, opening the de-aeration valve 6 and allowing the air trapped in the dirty fuel side of the receptacle 2 to be purged into the filtered fuel outlet line 4, as best shown in FIG. 2. Movement of the ball 7 may be due to either or both of the suction in the outlet line 4 or the pressure in the fuel filter generated by the incoming unfiltered fuel.

The relative size of the valve housing 6a, the valve inlet, the valve outlet and the ball size, density and mass relative to the differential pressure generated across the ball 7 determines the pressure differential required to open and close the valve. The valve inlet and outlet are between approximately 1 to 15 mm in diameter. The inlet and outlet diameter used depends on the filter and the fuel flow rate of the fuel system. The ball size may range between approximately 2-20 mm in diameter. The ball size is greater than the diameter of the inlet and outlet.

Although the ball 7 can be designed to have a higher density than fuel, the resulting pressure drop which occurs during running of the fuel filter is sufficient to lift the ball 7 against its resultant mass differential, hence allowing the ball to move between the lower and upper sealing faces 8 and 9. The resultant mass differential for the ball 7 is effectively the mass of the ball minus the mass of the fuel displaced by the ball.

The resulting differential pressure acting on the ball 7 allows the escape of air whilst the ball is moving between the upper and lower faces. At the same time the air is being purged, the receptacle 2 can continue to fill with unfiltered fuel from the inlet line 3. This maximises the air displaced from the fuel filter 2.

Figure 3:
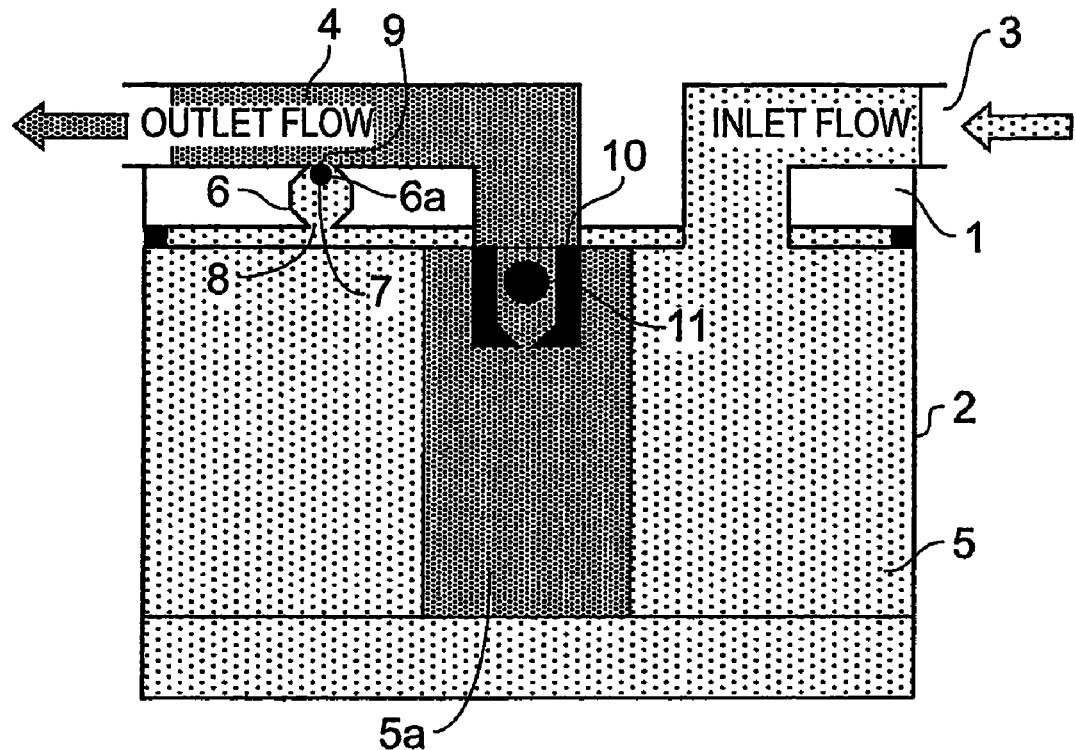
FIG. 3 is a cross-sectional side view of the de-aeration system, showing the fuel filter in running condition.

The air continues to purge from the receptacle 2 until the level of unfiltered fuel rises and builds up around the valve. This causes the pressure drop across the inlet to outlet side of the valve to increase. Despite the ball being of higher density than the fuel, once the fuel reaches the valve inlet, the fuel flow creates a higher pressure differential across the outlet. The resultant force provided by the higher pressure differential causes the ball to rise further. When the fuel reaches the ball 7, the liquid contact reduces the relative weight of the ball and causes it to lift and eventually seal on the upper sealing face 9, as best shown in FIG. 3. Hence, this seal closes the valve and prevents the unfiltered fuel from the dirty fuel side of the filter from entering into the filtered fuel outlet line 4.

Figure 4:
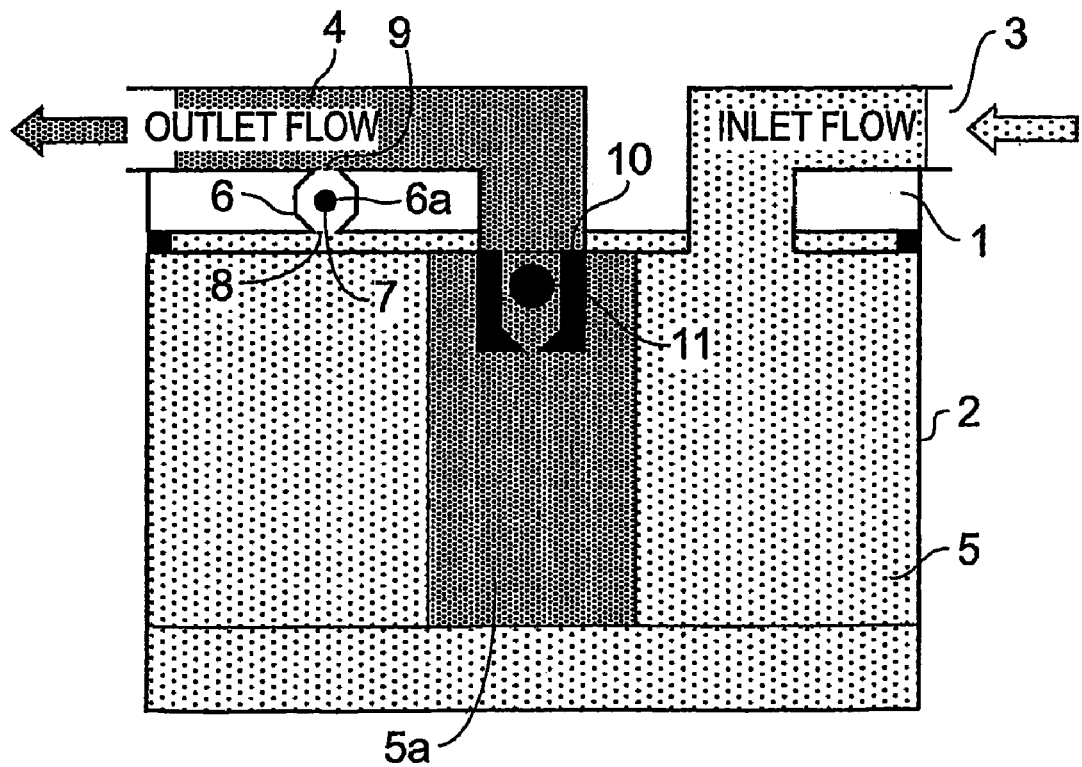
FIG. 4 is a cross-sectional side view of the de-aeration system, showing the fuel filter in running condition with air re-accumulating in the housing.

FIG. 4 shows the de-aeration system after it has been operating over a significant period of time. The wetted filter element 5 has separated the air from the incoming unfiltered fuel and over time this has accumulated in the valve housing 6a. When air collects in the valve housing and surrounds the ball 7, the relative weight increase of the ball allows it to fall away from the upper sealing face 9. Hence, the valve moves back into an open configuration. The air in the valve housing 6a is then able to escape until the ball 7 becomes surrounded by fuel again such that the relative weight of the ball is reduced, and the ball lifts to re-seal against the upper sealing face 9. The cycle of the valve moving from an open configuration where the ball is situated between the upper and lower sealing faces allowing air to purge from the filter, and a closed configuration where the ball seals against the upper sealing face 9, may occur at frequencies of less than one second.

Figure 5:
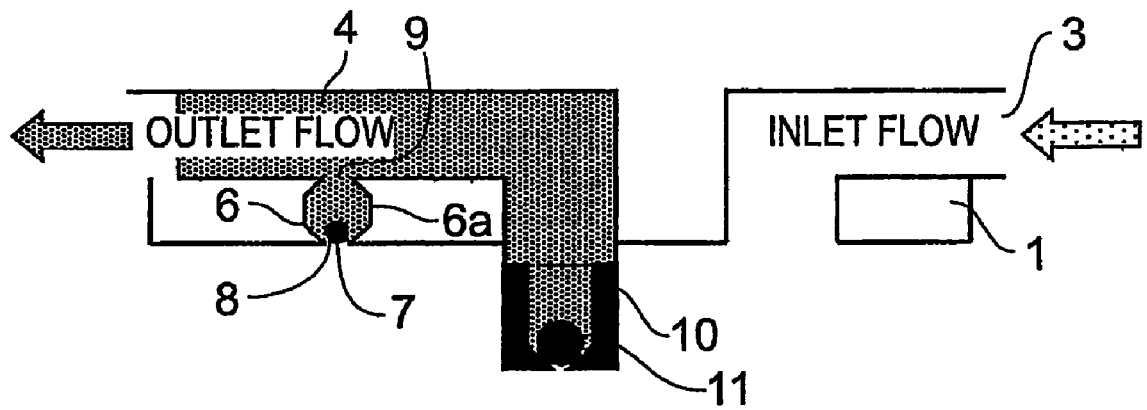
FIG. 5 is a cross-sectional side view of the de-aeration system when the fuel filter is primed and in its stopped condition.

The seal between the ball 7 and the upper sealing face 9 will also be broken when the system is turned off and the flow of fuel ceases. This is due to gravity drawing the ball 7 back to rest against the lower sealing face 8. This creates a seal which prevents the fuel in the outlet line 4 from bleeding back into the unfiltered fuel supply contained in the receptacle 2, as best shown in FIG. 5. Once the system flow restarts any air trapped on the dirty fuel side of the fuel filter element 5 may be purged again, as shown in FIG. 2.

When the receptacle 2 is separated from the filter head 1 during servicing, the filtered fuel is prevented from draining from the outlet line 4, though the valve 6 and back into the dirty fuel side of the filter by the seal in the de-aeration valve created between the ball 7 and the lower face 8. The filtered fuel in the outlet line is also prevented from draining back into the filter core 5a from the seal provided by a filter outlet valve 10. Although the embodiments in the Figures specifically depict a filter outlet ball valve for preventing the filtered fuel from draining back into the filter core 5a, any suitable valve may be utilised.

Once the service is complete and the receptacle 2 is reattached to the filter head 1, the excess air is purged back into the fuel outlet line 4 when the system flow restarts, as shown in FIG. 2.

The fuel filter system of FIGS. 1 to 5 may be installed on the suction side of a main pump in a fuel system for an injector gallery.

Figure 6:
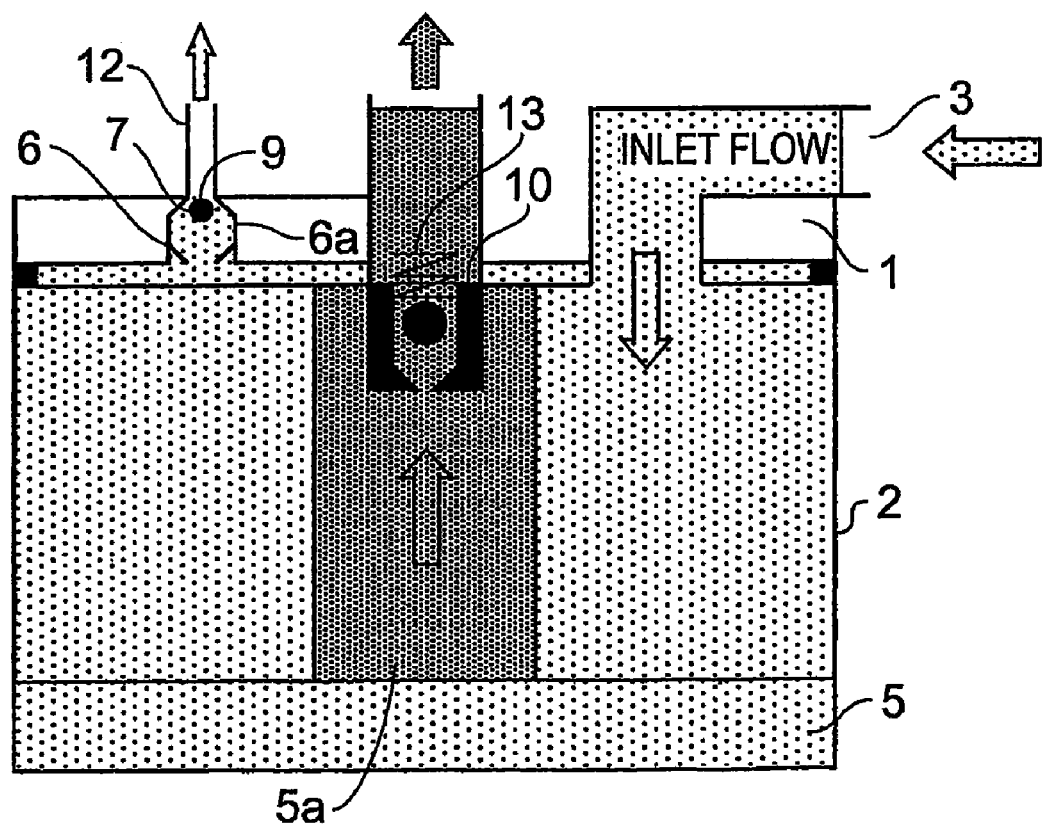
FIG. 6 is a cross-sectional side view of an alternative embodiment of the de-aeration system, showing the de-aeration valve having an outlet returning the air to a fuel tank.

FIG. 6 shows an alternative embodiment of the invention in which the filter head 1 includes an outlet line 12 for connecting the de-aeration valve 6 to a fuel tank. In this embodiment, the purged air is returned to the tank instead of passing into the fuel outlet line 4. This benefits a pressure application and could be applied to both primary and main/final filters.

The de-aeration valve of FIG. 6 requires the ball 7 to seal against the upper sealing face 9 if it is desired that no fuel is returned back to the tank during running of the filter system. However it may be preferable to allow a slight continuous bleed between the ball 7 and the upper sealing face 9. Although this may permit a small amount of fuel to bypass the fuel filter element 5, it will also allow any air trapped in the dirty fuel side of the filter element to be purged from the fuel filter and return back to the tank, rather than enter a fuel injection gallery. This bleed may be created by including a by-pass groove (not shown) in the upper sealing face 9. Allowing aerated fuel to continually return back to the fuel tank may assist in maintaining maximum volumetric efficiency of the fuel filter element.

The fuel filter of FIG. 6 may be installed on the pressure side of a main pump in a fuel system for an injector gallery.

In embodiments where the fuel filter is installed on the pressure side of a main pump, the filter may include a filter outlet ball valve in which a filter outlet ball 11 is pressure controlled by either it's own mass/weight or a spring 13, as best shown in FIG. 6. If air is present at the start of the fuel filter operation, once the fuel system is running, the pressure differential may be sufficient to open the de-aeration valve 6 but not the filter outlet valve. The de-aeration valve 6 will remain open until the air is purged and the fuel level rises causing the de-aeration ball 7 to lift and move the de-aeration valve into a closed configuration. A small proportion of fuel and/or air may still bypass the de-aeration valve 6 via a by-pass groove.

The closure of the de-aeration valve will then cause an increase in pressure within the fuel filter which is sufficient to lift the filter outlet ball 11 and open the filter outlet valve. Hence the working relationship between the filter outlet valve and the de-aeration valve allows any air in the fuel filter to pass through the de-aeration valve 6 and straight back to the tank, rather than passing through the filter outlet valve, into the clean fuel outlet line 4 and then into a fuel injection system. Utilising the valves in this way may allow the air from the filter to be vented rapidly after a filter element change.

Figure 7:
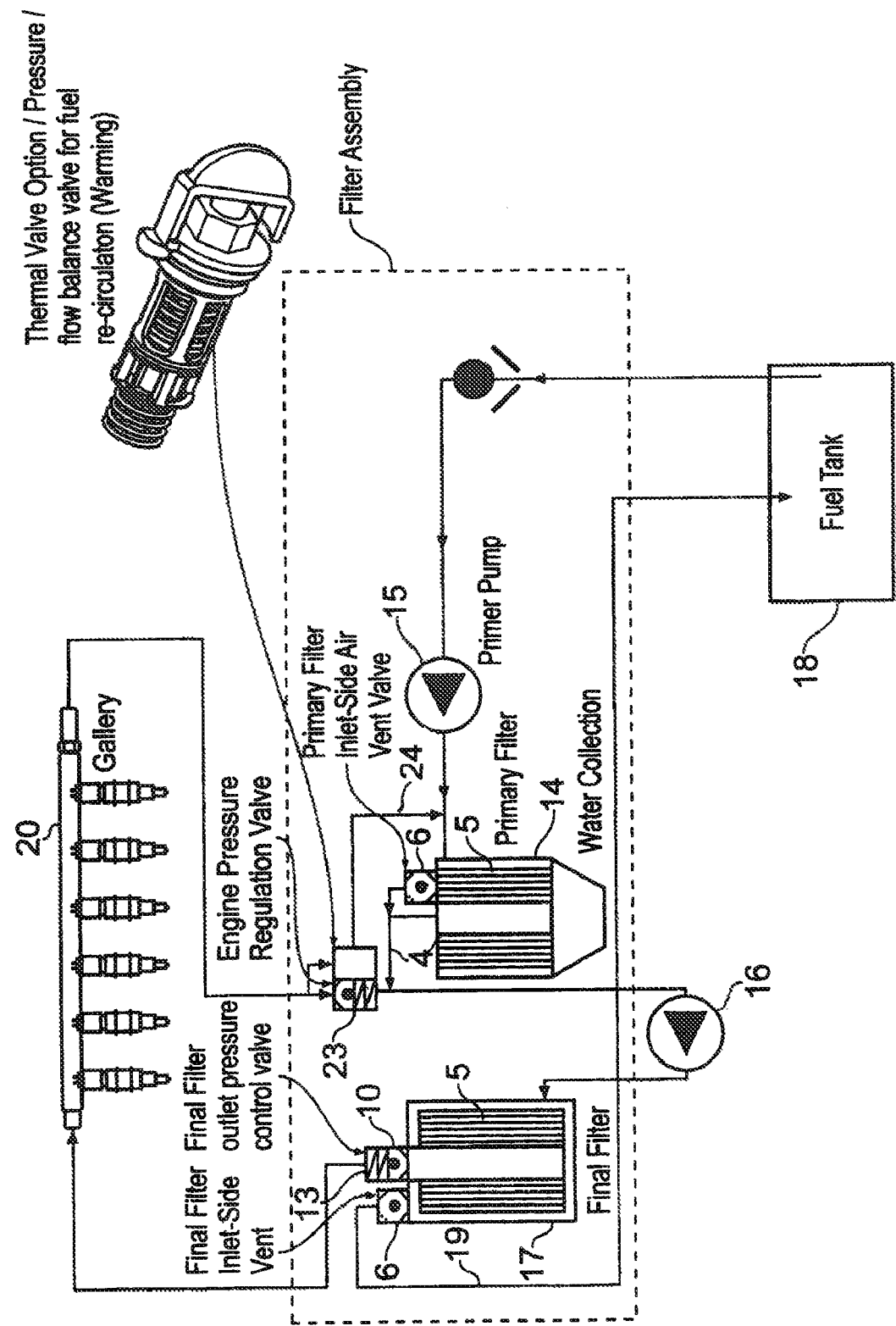
FIG. 7 and FIG. 8 show a cross-sectional side view of a primary fuel filter and a main/final fuel filter installed in a fuel system. Each filter includes a de-aeration valve in accordance with an embodiment of the invention.
Figure 8:
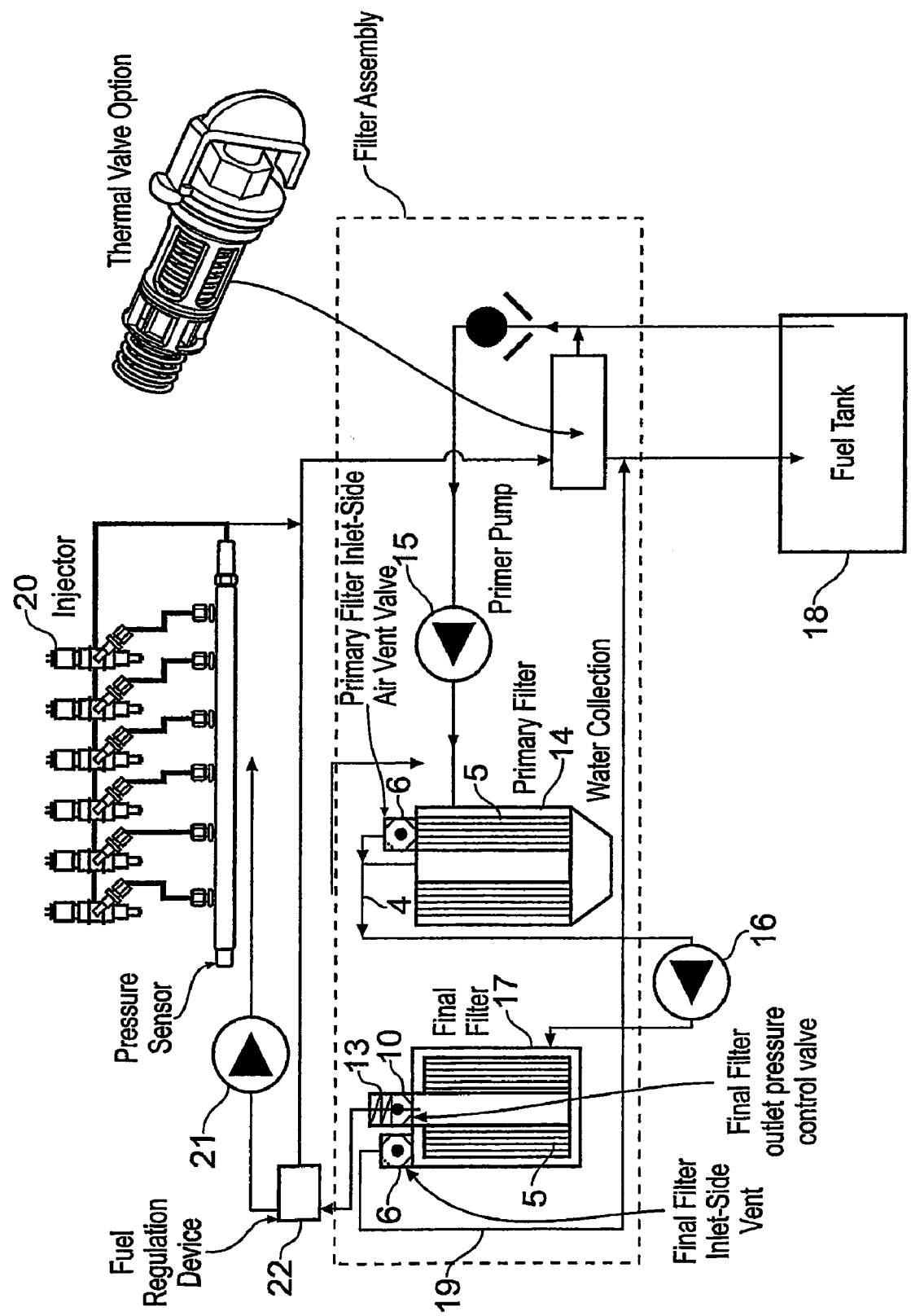

FIGS. 7 and 8 show a fuel system including a primary fuel filter 14 installed between the pressure side of a primer pump 15 and the suction side of a main pump 16. A final fuel filter 17 is installed on the pressure side of the main pump 16. A fuel tank 18 is located on the suction side of the primer pump 15. Both the primary filter 14 and final filter 17 may include at least one embodiment of a de-aeration valve 6 as described above. The primary filter 14 can include a de-aeration valve as described with reference to and shown in, for example, FIGS. 1 to 5, while the final filter 17 may include a de-aeration valve as described with reference to and shown in, for example, FIG. 6.

Referring back to FIGS. 7 and 8, the de-aeration valve 6 of the primary filter 14 is in fluid communication with the fuel outlet line 4 which leads to the main pump 16, while the de-aeration valve 6 of the final filter 17 is in fluid communication with a fuel line 19 which leads back to the tank 18. The final filter 17 also includes a filter outlet valve 10, as described above, which leads to a fuel injector gallery 20.

In use, when the fuel system is started, the primer pump 15 sucks fuel from the fuel tank 18 and pumps it into the primary filter 14. The suction from the main pump 16 also assists in sucking the fuel through the primary filter 14. As described above, the air trapped in the primary filter 14 is then purged into the fuel outlet line 4 via the de-aeration valve 6. Filtered fuel from the element 5 also moves into the fuel outlet line 4 via a fuel outlet. The filtered fuel and/or purged air is then sucked into the main pump 16 and pumped into the final filter 17. Any air in the final filter 17 is purged back to the fuel tank 18 via the de-aeration valve 6 and the filtered fuel is pumped into the fuel injector gallery 20 via the fuel outlet valve 10. In the fuel system shown in FIG. 8, an additional pump 21 is located between the final filter 17 and the injector gallery 20 to pump fuel into the injector gallery via a fuel regulation device 22.

Any fuel exiting from the injector gallery 20 then moves either back to the tank 18, as shown in FIG. 8, or through a pressure regulation valve 23 and back to the main pump 16 or primer pump fuel line 24, as shown in FIG. 7.

It will be appreciated that the illustrated de-aeration valve facilitates purging of air collected in a fuel filter housing, whilst reducing the likelihood of the unfiltered fuel bypassing the fuel filter element and contaminating the filtered fuel, or the likelihood of air being pumped into a injector gallery.

Although the invention has been described with reference to a specific example, it will be appreciated by those skilled in the art that the invention can be embodied in many other forms.

What is claimed is:

1. A fuel filter system comprising a fuel filter having a housing for containing a fuel filter element, a fuel inlet and a fuel outlet, and a de-aeration system for the fuel filter system, said de-aeration system including:
    a de-aeration valve having:
    a valve inlet in a lower face of said valve for connection to said housing;
    a valve outlet in an upper face of said valve, said valve outlet is in fluid communication with a filtered fuel outlet line for receiving filtered fuel from a clean fuel side of said fuel filter element, the filtered fuel outlet line including a fuel outlet valve; and
    a ball having a relatively higher density than fuel in said filter system, wherein said ball is configured to lift between said lower face and said upper face in response to an air pressure differential acting on said ball for opening said valve to purge air trapped in said housing, and wherein said ball is further configured to close said valve by sealing against said valve outlet in said upper face in response to a pressure differential across said ball created by unfiltered fuel entering said valve.

2. A fuel filter system according to claim 1 wherein said housing comprises a filter head including said fuel inlet, said fuel outlet and said de-aeration valve, and a filter receptacle selectively engageable with said filter head for containing said fuel filter element.

3. A fuel filter system according to claim 1 wherein said de-aeration valve is adapted to provide purging of air trapped between said filter element and the internal walls of said housing.

4. A fuel filter system according to claim 1 wherein said ball is configured to seal against the valve inlet in said lower face when the fuel flow cycle through said filter system is not running.

5. A fuel filter system according to claim 1 wherein said system is adapted such that when the fuel flow cycle through said filter system ceases, gravity returns said ball to said lower face and a portion of said filtered fuel contained in said outlet moves into said valve, sealing said ball against said lower face.

6. A fuel filter system according to claim 1 wherein said ball is configured to move between said lower face and said upper face in response to air re-accumulating in said valve to purge said air trapped in said valve.

7. A fuel filter system according to claim 1 wherein said valve inlet is approximately 1-15 mm in diameter.

8. A fuel filter system according to claim 7 wherein said valve inlet is approximately 5 mm.

9. A fuel filter system according to claim 1 wherein said valve outlet is approximately 1-15 mm in diameter.

10. A fuel filter system according to claim 9 wherein said valve outlet is approximately 5 mm.

11. A fuel filter system according to claim 1 wherein said ball is approximately 2-20 mm in diameter.

12. A fuel filter system comprising a final fuel filter outlet, and a de-aeration system for the fuel filter system, said de-aeration system including:
    i) a de-aeration valve having:
    ii) a valve inlet in a lower face of said valve for connection to said housing;
    iii) a valve outlet in an upper face of said valve; and
    a ball having a relatively higher density than fuel in said filter system, wherein said ball is configured to lift between said lower face and said upper face in response to an air pressure differential acting on said ball for opening said valve to purge air trapped in said housing, and wherein said ball is further configured to close said valve by sealing against said valve outlet in said upper face in response to a pressure differential across said ball created by unfiltered fuel entering said valve, and
    a final filtered fuel outlet valve in fluid communication with an injector gallery.

13. A fuel filter system according to claim 12, wherein said fuel outlet valve is a ball valve, resiliently biased in a closed configuration.

14. A fuel filter system according to claim 13 wherein said resilient bias is provided by a spring.

15. A fuel filter system according to claim 13 wherein said resilient bias is provided by the weight of said ball.

16. A fuel filter system as in claim 12, wherein said valve outlet is in fluid communication with a fuel tank.

17. A fuel filter system comprising a fuel filter having a housing for containing a fuel filter element, a fuel inlet and a fuel outlet, and a de-aeration system for the fuel filter system, said de-aeration system including:
    a de-aeration valve having:
    a valve inlet in a lower face of said valve for connection to said housing on a dirty fuel side of said filter element;
    a valve outlet in an upper face of said valve, said valve outlet is in fluid communication with a filtered fuel outlet line for receiving filtered fuel from a clean fuel side of said fuel filter element;
    a ball having a relatively higher density than fuel in said filter system, wherein said ball is configured to lift between said lower face and said upper face in response to an air pressure differential acting on said ball for opening said valve to purge air trapped in said housing, and wherein said ball is further configured to close said valve by sealing against said valve outlet in said upper face in response to a pressure differential across said ball created by unfiltered fuel entering said valve; and
    a filtered fuel outlet valve in fluid communication with said filtered fuel outlet line.

18. A fuel filter system comprising a fuel filter having a housing for containing a fuel filter element, a fuel inlet and a fuel outlet, and a de-aeration system for the fuel filter system, said de-aeration system including:
    a de-aeration valve having:
    a valve inlet in a lower face of said valve for connection to said housing on a dirty fuel side of said fuel filter element;
    a valve outlet in an upper face of said valve, said valve outlet is in fluid communication with a fuel tank;

a ball having a relatively higher density than fuel in said filter system, wherein said ball is configured to lift between said lower face and said upper face in response to an air pressure differential acting on said ball for opening said valve to purge air trapped in said housing, and wherein said ball is further configured to close said valve by sealing against said valve outlet in said upper face in response to a pressure differential across said ball created by unfiltered fuel entering said valve; and a filtered fuel outlet valve in fluid communication with a filtered fuel outlet line.

\* \* \* \* \*